United States Patent [19]

Kenny et al.

[11] Patent Number: 5,460,466
[45] Date of Patent: Oct. 24, 1995

[54] FIXING DEVICES

[76] Inventors: Michael Kenny, 42 Walton Road, Sidcup, Kent, Great Britain, DA14 4LN; David D. Dunkley, 35 Marlborough Park, Sidcup, Kent, Great Britain, DA15 9DL; Anthony Gillham, 157 Westbrook Park, Sidcup, Kent, Great Britain, DA16 1QS

[21] Appl. No.: 199,297
[22] PCT Filed: Sep. 1, 1992
[86] PCT No.: PCT/GB92/01595
§ 371 Date: Mar. 2, 1994
§ 102(e) Date: Mar. 2, 1994
[87] PCT Pub. No.: WO93/05305
PCT Pub. Date: Mar. 18, 1993

[30] Foreign Application Priority Data

Sep. 3, 1991 [GB] United Kingdom ............ 9118825
Jan. 25, 1992 [GB] United Kingdom ............ 9201655

[51] Int. Cl.⁶ .............................. F16B 15/00; F16B 37/04
[52] U.S. Cl. .......................... 411/179; 411/183; 411/447; 411/457
[58] Field of Search .................... 411/179, 183, 411/447, 448, 451, 452, 456, 457, 471, 479, 908

[56] References Cited

U.S. PATENT DOCUMENTS

| | | |
|---|---|---|
| 2,283,243 | 5/1942 | Vatet . |
| 2,745,308 | 5/1956 | Gisondi ............................ 411/448 |
| 3,710,672 | 1/1973 | Hallock ............................ 411/479 |
| 4,031,802 | 6/1977 | Hallock ............................ 411/479 X |
| 4,339,218 | 7/1982 | Navarre ............................ 411/419 |
| 4,533,288 | 8/1985 | Rivkin et al. ..................... 411/176 |
| 4,826,381 | 5/1989 | Kiriyama .......................... 411/908 X |
| 4,971,503 | 11/1990 | Barnell et al. .................... 411/908 X |

FOREIGN PATENT DOCUMENTS

| | | | |
|---|---|---|---|
| 790800 | 11/1935 | France ............................ 411/457 |
| 3838015C1 | 6/1990 | Germany . | |
| 117712 | 11/1946 | Sweden ........................... 411/447 |

Primary Examiner—Neill R. Wilson
Attorney, Agent, or Firm—Fitch, Even, Tabin & Flannery

[57] ABSTRACT

A moulded nylon glass fiber reinforced fixing device has an elongate body with leading and trailing ends, the body comprises two or more similar legs which splay apart to hold the device in position when the leading end is driven into blockwork. Devices shown are rectangular in section with legs defined by slot(s) running partially along the length of the device away from the leading end. One form of device has a slot extending through its thickness defining two legs and another two slots defining four legs. A third has two slots each extending partway through the device from opposed faces and which are parallel and separated by a readily rupturable wall part. A fourth has a slot extending between readily rupturable parts of opposed side walls of the device. Surfaces to contact blockwork may be roughened and surfaces defining slot(s) may have triangular grooves therein. Described devices have a circular in section bore extending at least part of the length of the device from the trailing end which widens in moving towards the leading end—the bores may flare outwardly in moving to the leading end and/or be in two parts—the bore diameter at the trailing end being less than the diameter of the remainder. The bore may be provided with lands extending inwardly thereof, or be threaded, at the trailing end and apertures may pass from the bore through the material of the device to ease expansion of the trailing end when a screw is inserted in it. The outer surfaces of the trailing end of the device may flare outwardly in moving away from the leading end, alternatively, the trailing end of the device may be flanged.

29 Claims, 3 Drawing Sheets

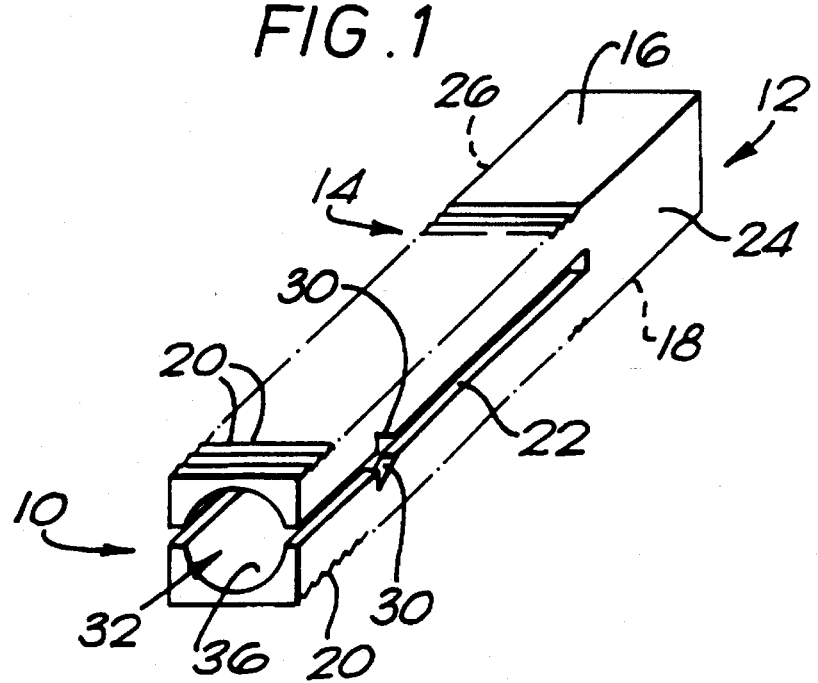
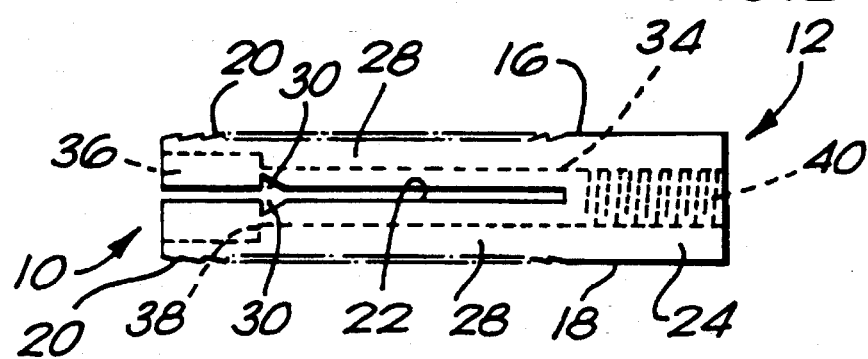
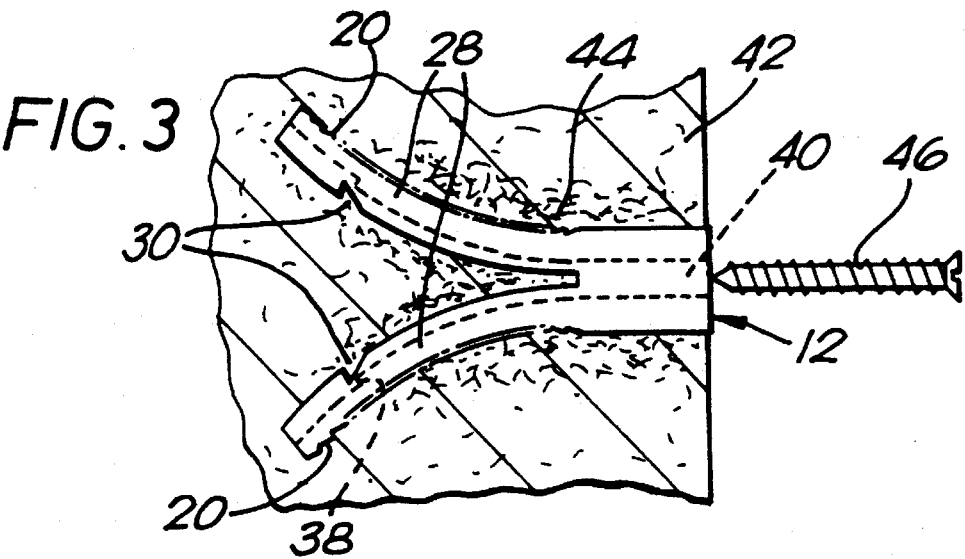

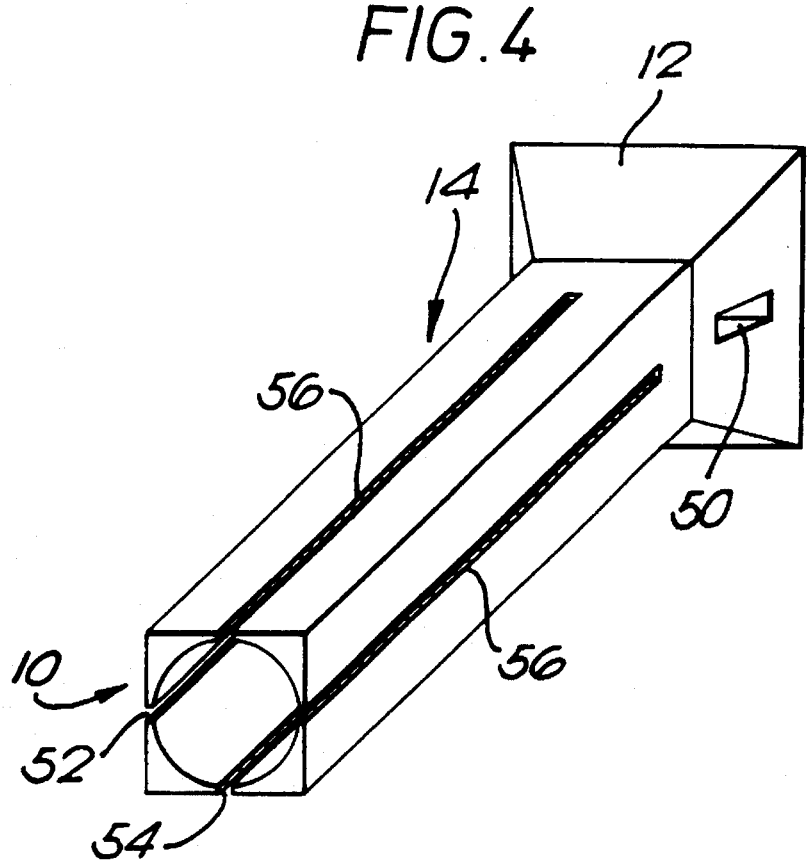
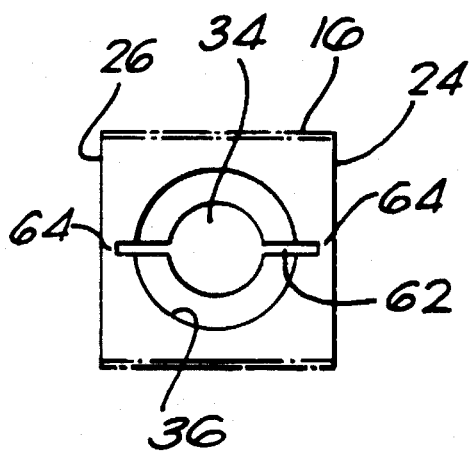
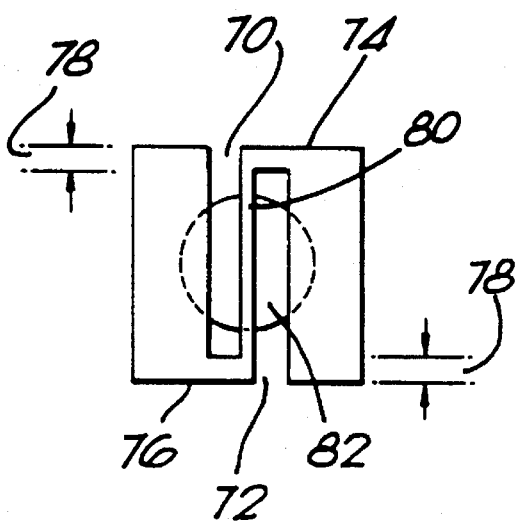

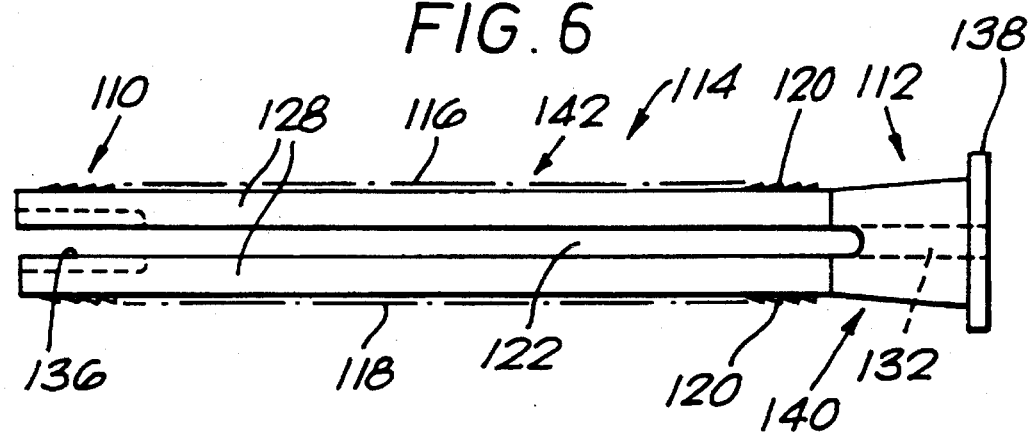
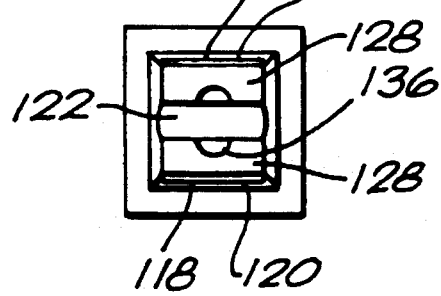
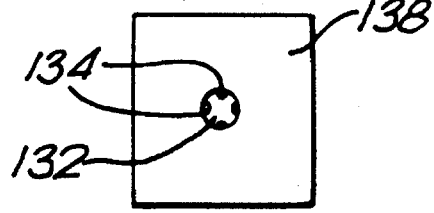
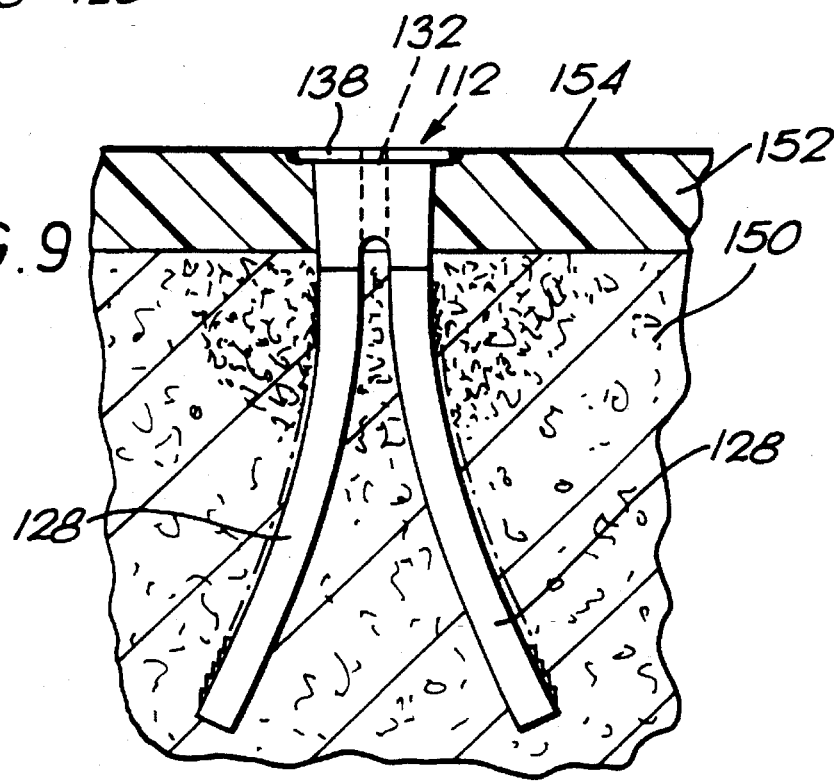

FIXING DEVICES

BACKGROUND OF THE INVENTION

The invention relates to fixing devices, more particularly devices enabling individuals to fix articles to blockwork.

In this specification and in the claims appended hereto the term blockwork is to be taken to encompass aerated, foamed and the like building blocks of concrete or other materials which are usable in building and which are of a relatively more friable or porous nature than the majority of traditional building bricks.

In order to fix an article to a surface, for example a picture, shelf or cupboard to a wall it is necessary to provide for the secure fixing of the article to the surface.

If the surface is of wood this is relatively easily done by fixing the article to the surface with one or more pins, nails or wood screws.

If, as is more usual, one wishes to fix an article to brickwork or blockwork it is possible—for some light articles (e.g. pictures)—to make use of masonry pins and/or picture hooks comprising hardened steel nails or pins adapted to be driven by a hammer into the material of the surface.

If a heavier article is to be supported it is usual to pre-drill a hole in the wall, insert a plug into the hole in which a screw may be fitted; subsequent insertion of the screw in the plug causing it to expand and bear against the sides of the pre-drilled hole such that the screw and any article it supports is firmly held in the desired position.

Thus to fix articles to brickwork or blockwork generally requires the use of a drill with which to predrill a hole for a plug, which may be a disadvantage to the user in requiring him to obtain and make use of another tool.

Such arrangements work in the majority of cases, however, problems can arise if the surface is blockwork of a relatively friable or porous nature (for example modern day breeze or equivalent foamed aerate concrete blocks).

With such blocks their friable nature has the effect that they tend to break up as a hole is drilled into them with the result that it is difficult to form the initial hole. Even if a relatively "clean" hole can be pre-drilled in such blockwork the sides of the hole tend to break up as a screw forces the expansion of any plug placed in the hole.

For relatively light articles the friable nature of the blocks prevents the efficient use of masonry pins and the like—the material of the blocks tending to break-up as the pin is driven into it.

SUMMARY OF THE INVENTION

A first object of the present invention is to provide a fixing device, enabling the fixing of screws and the like to blockwork as hereinbefore defined, which is readily usable with blockwork to provide a secure fixing.

A second object of the present invention is to provide a fixing device which may be relatively simply and easily driven into blockwork without need for pre-drilling or pre-forming holes therein.

In one aspect the invention provides a device fixable in blockwork, which device has a plastics material elongate body portion with leading and trailing ends, wherein the elongate body portion is generally rectangular in cross-section along its length, and is formed of two or more leg parts which when the leading end is driven into blockwork splay apart to hold the device in the blockwork.

Desirably, the device is formed of a moulded plastics material—preferably nylon which is glass fiber reinforced.

Again, the leg parts may be generally rectangular in cross-section and be defined by one or more slots extending from the leading end toward the trailing end of the device along part of the length of the elongate body portion.

Each said slot preferably extends along substantially two thirds of the length of the device from the leading towards the trailing end.

Each said slot may extend through the thickness of the elongate body portion.

In one form of device embodying the invention there is a single slot extending through the thickness of the device, said slot defining two mutually opposed leg parts of substantially equal size.

In an alternative form of device embodying the invention, there are a pair of slots the depth of each of which is less than the thickness of the elongate body portion and which extend generally parallel to one another from opposed faces of that body portion, said slots being separated by a thin wall which extends over the major part of the depth of each of them.

In yet another alternative form of device embodying the invention there is a single slot located generally centrally of the elongate body portion to extend between opposed side walls thereof, said slot being terminated by thin parts of said opposed side walls of the elongate body portion.

If desired the device may be formed such that opposed faces of the or each slot diverge in moving away from the trailing end of the device such that the cross-sectional areas of said leg portions reduce in moving toward the leading end of the device.

Surfaces of the device which in use contact blockwork are with advantage roughened. This roughening may be effected by providing serrations on opposed outer surfaces of the device.

Serrations may be provided on facing surfaces of the or each said slot of the device.

Opposed faces defining at least one said slot formed in the device may be provided with a groove extending thereacross, and if provided said groove may be generally triangular in section.

Outer surfaces of the device may flare outwardly at the trailing end thereof in moving away from the leading end of the device.

Alternatively, the trailing end of the device may be provided with a flange portion extending generally normally of the axis of the elongate body portion, which flange portion is preferably generally rectangular.

In a device embodying the invention with especial advantage, there may be provided a central bore, preferably generally circular in section, extending along at least a part of the elongate body portion from the trailing end of the device.

In one embodiment the central bore extends the length of the device and is wider at the leading end than at the trailing end thereof.

In this embodiment the central bore may be provided with a diverging conical flare in moving to the leading end of the device along the elongate body part.

Alternatively, the central bore may be provided in two parts—the diameter of that part of the bore at the trailing end of the device being substantially constant and less than the diameter of the other part of said bore.

The central bore may be provided with one or more, preferably four or more, protrusions over at least part of the length thereof from the trailing end of the device, which extend radially inwardly of the bore and of the elongate body portion of the device.

Again, said bore may threaded internally at the trailing end of the device.

The trailing end of the device may be formed with apertures extending from the central bore to the surface of the device to enable ready expansion of the material of the device when a screw or other threaded member is inserted therein.

The cross-sectional area of the elongate body portion may reduce over at least part of the length thereof in moving from the trailing end toward the leading end of the device—in one advantageous arrangement the cross-sectional area of the elongate body portion reduces at a first rate over a first part of the length of the body portion in moving from the trailing to the leading end of the device and at a second, lesser, rate in moving over a second part of the length of the body portion.

BRIEF DESCRIPTION OF THE DRAWINGS

The above and other aspects, features and advantages of the invention will become apparent from the following description of an embodiment of the invention made with reference to the accompanying drawings, in which:

FIG. 1 is a perspective view of a device embodying the invention,

FIG. 2 is a side view of the device of FIG. 1,

FIG. 3 is a side view of the device of FIG. 1 when driven into blockwork,

FIG. 4 is a view similar to FIG. 1 and shows a modified form of device embodying the invention and of FIG. 1, FIG. 5 shows at A and B end views of two further devices embodying the invention, FIG. 6 is a side view of a further device embodying the invention, FIGS. 7 and 8 are end views of the device of FIG. 6 showing respectively, the trailing and leading ends thereof, and FIG. 9 shows the device of FIGS. 6 to 8 in use.

DESCRIPTION

The device shown in FIGS. 1 and 2 has a leading end 10 and trailing end 12 interconnected by an elongate body portion 14 which is rectangular in section. Opposed upper and lower outer surfaces 16 and 18 of body portion 14 are are roughened by being provided with serrations 20 over most of the length of the device running back from the leading end 10.

A slot 22 is formed extending through the thickness of the device and generally parallel to surfaces 16 and 18 from side walls 24 and 26 of the device. Slot 22 defines two substantially similar leg parts 28 which run back from the leading end of the device over approximately two thirds of the length of body portion 14.

Each face of slot 22 is provided with a groove 30 which extends normally of the faces 24 and 26—that is to say across the faces defining slot 22 and is generally triangular in section.

There is further provided a central bore 32 which runs the length of the device. Central bore 32 is generally circular in section and a first part 34, of it running from the trailing end of the device is of a substantially smaller diameter than the second part 36 adjacent the leading end of the device. The first and second parts 34, 36 of bore 32 are connected by a shoulder 38.

The first part 34 of the bore 32 over at least part of its length at the trailing end 12 of the device, is provided with internal screw threading 40.

The device is made of glass fiber reinforced moulded nylon material (e.g. a 35% medium—short glass fiber mix in nylon).

In use one simply places the leading end 10 of the device against blockwork 42 (see FIG. 3) and the device is then driven into the blockwork by impacting the trailing end 12 using a club hammer, gun or any other suitable means. In moving into the blockwork the legs 28 are forced to splay apart and by virtue of the natural resilience of the material of the device the legs tend to grip the material of the blockwork.

It is to be noted the material of the blockwork 42 is compacted about legs 28 as the device is further driven into the blockwork—as indicated at 44 in FIG. 3. This compaction of the blockwork material acts to firmly grip the device and hold it in position. It is believed the action of the shoulders 38 is to increase this compaction.

The serrations 20 and grooves 30 aid the fixture of the device within the blockwork.

After driving the device into the blockwork it is possible to insert (see FIG. 3 particularly) a screw 46 into the threaded end part 40 of the bore 34 of the device.

It is thought the particular shape of the device shown in FIGS. 1 to 3 has advantages over other shapes which could be adopted.

By providing that the central bore is generally circular and of increasing diameter in moving along the length of the device from the trailing to the leading end the degree by which the legs 28 will splay apart as the device is driven into blockwork will be enhanced. It is believed other shapes of bore could, however, be used e.g. bores which are rectangular in section, or oval. Any bore which is provided may be of constant dimensions along the length of the device, and if desired the central bore could be omitted or be provided in tapering form—that is to say conically outwardly flaring in moving from along the body portion from the trailing to the leading end of the device.

As described the inner surface of the central bore of the device at the trailing end of the device is provided with female screw threading. It will be appreciated that if desired this threading may be omitted—any screw which is inserted into the bore simply cutting its own thread as it is driven home—or that the screw threading may be replaced by a generally annular inwardly extending lands, ridges or protrusions which will enable the "snap" fitting of an appropriately shaped device into the end of the bore.

Again it will be appreciated that the outer generally rectangular, sectional shape of the device may be varied and other sectional shapes (e.g. any regular polygonal shape may be used). It is believed, however, the use of a non-circular, rectangular shape of the outer surface of the device is of particular efficacy in preventing the device twisting or rotating as or after it is driven into blockwork.

Although as described the slot extends substantially two thirds of the the length of the device from its leading to its trailing, end the slot length may be varied and it may extend any suitable distance along the length of the device between one-half and seven-eighths of its length from the leading to the trailing end thereof.

Again, although the end of the slot nearer the trailing end of the device is shown to have a particular form it will be appreciated that this may be varied—in particular it is possible to have this end of the slot of enlarged size to increase the propensity of the legs to splay apart as the device is driven into blockwork.

It will be appreciated that various other modifications may be made to the device without departing from the scope of the invention and some of these are shown in FIGS. 4 to 9.

FIG. 4 shows a device which is generally same as that shown in FIGS. 1 to 3 (parts common to both FIGS. are given the same reference numerals) save that the trailing end 12 is flared—that is to say the outer surfaces of the trailing end of the device diverge outwardly in moving away from the leading end of the device.

Again—slots or apertures 50 are provided extending from the central bore 32 through the flared walls of the trailing end of the device allowing more readily the expansion of the trailing end of the device as a screw or the like is driven thereinto.

The single slot 22 of the arrangement of FIGS. 1 to 3 has been replaced by two slots 52 and 54 extending generally at right angles to one another and dividing the leading end and the elongate body portion over most of its length into four substantially similar leg parts which will splay away mutually one from the others as the device is driven into blockwork. It will further be seen that neither of the slots 52 and 54 is provided with a groove 30, however, the opposed faces of the slots are roughened by being provided with serrations 56.

Other devices embodying the invention are shown in FIG. 5.

FIG. 5A is an end view of the leading end of a device similar to that shown in FIGS. 1 to 4 and common parts are again given the same reference numerals.

The arrangement of FIG. 5A however differs from that shown in the earlier figures in that it is provided with a bore which is in two sections. First bore section 34 is of constant diameter and is located at the trailing end of the device to extend approximately one third the length of the device. The second bore section 36—which extends the rest of the length of the device—is outwardly flaring in moving toward the leading end of the device.

A generally centrally located slot 62 is provided which extends parallel to the upper and lower serrated surfaces 16 and 18 of the device. It will be noted that slot 62 does not extend to the outer surfaces of the side walls 24 and 26 of the device but rather is provided with closed ends 64. The closed ends 64 of the slot 62 are thin, membrane like parts of the side walls of the device which are readily rupturable—broken or torn apart—as the device is driven into blockwork.

The modified arrangement shown in FIG. 5B provides two slots 70 and 72 which extend from opposed faces 74 and 76 of the device. Neither slot 70 nor 72 is of a depth equal to the spacing of the walls 74 and 76 and each terminates a substantial distance 78 from the opposed wall, It will be seen that the slots 72 and 74 run parallel to one another and are separated by a thin, membrane like wall 80 which is readily rupturable as the device is driven into blockwork.

It will be noted especially that with this particular arrangement no central bore is provided along the length of the elongate body portion from the leading end of the device—an axial bore 82 being provided merely at the trailing end of the device.

The device shown in FIGS. 6 to 9 is generally similar to the device described above and is provided with a leading end 110 and trailing end 112 at either end of an elongate body portion 114. Body portion 114 is again generally rectangular in section and is of the same or a similar moulded nylon glass fiber reinforced material.

The outer surfaces 116 and 118 of the body portion are roughened with serrations 120 similar to those described above with reference to FIG. 1.

A slot 122 is formed in body portion 114 to extend through the thickness of the device and run generally parallel to the surfaces 116 and 118. Slot 122 defines two substantially similar leg parts 128 which run from the leading end of the device over approximately three quarters of the length of the body portion 114.

The trailing end of the device is provided with a centrally located bore 132 which runs approximately 30% of the length of the device from the trailing end. Bore 132 is provided with four inwardly radially projecting lands 134 which extend the length of the bore. It is to be noted that the bore 132 is generally circular in section and that its cross-sectional area reduces in moving from the trailing towards the leading end of the device.

The leading end of the device is similarly provided with a centrally located circular bore 136 running back approximately 20% of the length of the device towards the trailing end. Bore 136 is of generally constant diameter along its length.

The trailing end of the device is provided with a flange 138 as shown. Flange 138 may be considered as a square section bead mounted on the outer edges of the trailing end of the device and has a thickness approximately 2% of the overall length of the device and a depth—extending away from the device—of approximately the same dimension.

As before the device is preferably made of glass fiber reinforced moulded nylon material (e.g. a 35% medium—short glass fiber mix in nylon).

It is to be noted that the cross-sectional area of the body 114 of the device reduces in in passing from the trailing end 112 to the leading end 110. The first section 40 of the body portion has an inward taper angle of 2.40° and extends substantially over the length of bore 132, whilst the second section 142 has an inward taper angle of 0.25° and extends from the end of the bore 132 to the leading end 114 of the device.

As with the device described with reference to FIGS. 1 to 3 it is possible to use the device of FIGS. 6 to 8 by simply placing the leading end 110 against blockwork and driving the device into the blockwork by impacting the trailing end 112 with a club hammer, gun or any other suitable means. In moving into the blockwork the legs 128 are forced to splay apart and by virtue of the natural resilience of the material of the device the legs tend to grip the material of the blockwork which will be compacted about those legs as the device is further driven in (see FIG. 9).

The device will be held firmly in position in the blockwork by the natural resilience of the material of the device and, as it is driven into the material, by the compaction of the material of the blockwork. This compaction is enhanced and aided by the tapering sections—sections of reducing cross-sectional area—140 and 142 of the elongate body 114. The section 140 especially will bind the blockwork material near the surface of the blockwork into which the device has been driven. It is believed the action of the second bore 36 at the leading end of the device is to increase this compaction.

After the device has been driven into blockwork it is possible to insert a screw into the exposed end of the bore 132 of the device. By virtue of the protrusions 134 formed on the inner wall of bore 132—which are of the same plastics material as the rest of the device—it is possible to use a variety of screw sizes (e.g. as an example, a device now described would be able to take any screw size between No. 6 and No. 10).

It will be appreciated the action of inserting a screw into the plastics material of the protrusions—and screwing it home—will further increase the compaction of the blockwork material surrounding the trailing end of the device.

Finally, it will be noted that in this arrangement the flange 138 will bear against the outer surface of the blockwork again increasing the compaction of the material in that area.

The utility of the device described is further enhanced by the provision of the flange 38—as shown in FIG. 9 it is possible to make use of this flange to enable the device itself to support articles on a blockwork wall.

As shown in FIG. 9 the device has been driven into blockwork 150 having first been driven through a plasterboard piece 152. It is to be noted particularly in this arrangement that the flange 138 has been partially driven into the material of the plasterboard trapping beneath it the paper lining 154 of the plasterboard. In this way the plasterboard is held firmly against the blockwork 150. If desired it is possible to then simply cover the end of the device in the usual manner such that a blockwork wall lined with plasterboard is produced.

It will be appreciated that the fixing device of FIGS. 6–9 may be used to support and hold any desired bracket or the like on the surface of the blockwork or the plasterboard—the bracket being formed with an aperture receiving the body of the fixing device but through which the flange 138 cannot pass.

Again, it will be appreciated that the device sown in FIGS. 6–9 may be modified by being provided at its trailing end with an integrally formed bracket or the like.

It will be appreciated that modifications may be made to the described devices without departing from the scope of the invention. For example, to enhance the gripping effect of the legs (28 or 128) as the device is driven into blockwork the opposed faces of the slots defining them may diverge in moving toward the leading end of the device so that the cross-sectional areas of the legs reduce in moving from the trailing to the leading end of the device.

Again, if the device of FIGS. 6 to 8 is simply to be used to hold plasterboard on a blockwork wall (by action of the flanges 138) the central bore 132 at the trailing end of the device may be omitted.

It will be further appreciated that the various modifications made to the arrangements described above with reference to the device of FIG. 1 may also be made to the device shown in FIGS. 6 to 8.

We claim:

1. A device fixable in blockwork, which device has a plastics material elongate body portion with leading and trailing ends, wherein the leading end of the elongate body portion is substantially rectangular and the elongate body portion is substantially rectangular in transverse cross section along its length and is formed of two or more leg parts which when the leading end is driven into blockwork splay apart to act to hold the device in the blockwork.

2. A device as claimed in claim 1, wherein surfaces of the device which in use contact blockwork are roughened.

3. A device as claimed in claim 2, wherein serrations are provided on opposed outer surfaces of the device.

4. A device as claimed in claim 3, wherein serrations are provided on facing surfaces of each said slot of the device.

5. A device as claimed in claim 1, wherein the outer surfaces of the device flare outwardly at the trailing end thereof in moving away from the leading end of the device.

6. A device as claimed in claim 1, wherein the trailing end of the device is provided with a flange portion extending generally normally of the axis of the elongate body portion.

7. A device as claimed in claim 6, wherein said flange portion is generally rectangular.

8. A device as claimed in claim 1, wherein there is provided a central bore extending along at least a part of the elongate body portion form the trailing end of the device.

9. A device as claimed in claim 8, wherein said central bore is generally circular in section.

10. A device as claimed in claim 9, wherein said bore is provided with one or more protrusions over at least part of the length thereof from the trailing end of the device, which extend radially inwardly of the bore and of the elongate body portion of the device.

11. A device as claimed in claim 10, wherein said bore is provided with at least four said protrusions.

12. A device as claimed in claim 9, wherein said central bore extends the length of the device and is wider at the leading end than at the trailing end thereof.

13. A device as claimed in claim 12, wherein said central bore has a diverging conical flare in moving to the leading end of the device along the elongate body part.

14. A device as claimed in claim 12, wherein said central bore is in two parts and the diameter of that part of the bore at the trailing end of the device is less than the diameter of the other part of said bore.

15. A device as claimed in claim 14, wherein said bore is threaded internally at the trailing end of the device.

16. A device as claimed in claim 8, wherein the trailing end of the device is formed with apertures extending from the central bore to the surface of the device to enable ready expansion of the material of the device when a screw or other threaded member is inserted therein.

17. A device as claimed in claim 1, wherein the cross-sectional area of the elongate body portion reduces over at least part of the length thereof in moving from the trailing end toward the leading end of the device.

18. A device as claimed in claim 17, wherein the cross-sectional area of the elongate body portion reduces at a first rate over a first part of the length of the body portion in moving from the trailing to the leading end of the device and at a second, lesser, rate in moving over a second part of the length of the body portion.

19. A device as claimed in claim 1, when formed of a moulded plastics material.

20. A device as claimed in claim 19, when formed of moulded nylon which is glass fiber reinforced.

21. A device as claimed in claim 19, where there are a pair of slots the depth of each of which is less than the thickness of the elongate body portion and which extend generally parallel to one another from opposed faces of that body portion, said slots being separated by a thin rupturable wall which extends over the major part of the depth of each of them.

22. A device as claimed in claim 19, wherein there is a single slot located generally centrally of the elongate body portion to extend between opposed side walls thereof, said slot being terminated by thin rupturable parts of said opposed side walls of the elongate body portion.

23. A device as claimed in claim 1, wherein the leg parts are generally rectangular in cross-section and are defined by one or more slots extending from the leading end toward the trailing end of the device along part of the length of the elongate body potion.

24. A device as claimed in claim 23, wherein each slot extends along substantially two thirds of the length of the device from the leading towards the trailing end.

25. A device as claimed in claim 23, wherein each slot extends through the thickness of the elongate body portion.

26. A device as claimed in claim 23, when formed with a single slot extending through the thickness of the device, said slot defining two mutually opposed leg parts of substantially equal size.

27. A device as claimed in claim 23, wherein the opposed faces of each said slot diverge in moving from the trailing end of the device such that the cross-sectional areas of said leg parts reduce in moving from the trailing toward the leading end of the device.

28. A device as claimed in claim 23, wherein opposed faces defining at least one said slot formed in the device are each provided with a groove extending thereacross.

29. A device as claimed in claim 28, wherein said groove is generally triangular in section.

* * * * *